United States Patent [19]

Tran

[11] 4,356,090
[45] Oct. 26, 1982

[54] FLOW-THROUGH OIL/WATER SEPARATION FILTER

[75] Inventor: Nhan V. Tran, Bellevue, Wash.

[73] Assignee: Marine Construction & Design Co., Seattle, Wash.

[21] Appl. No.: 305,994

[22] Filed: Sep. 28, 1981

[51] Int. Cl.$^3$ ............................................. B01D 29/02
[52] U.S. Cl. ................................. 210/350; 210/391; 210/508; 210/DIG. 5; 156/93; 156/578
[58] Field of Search ............... 210/799, 106, 108, 350, 210/391, 393, 397, 500.1, 506, 507, 508, 509, DIG. 5; 156/92, 93, 578

[56] References Cited

U.S. PATENT DOCUMENTS

| | | | |
|---|---|---|---|
| 2,395,301 | 2/1946 | Sloan | 210/DIG. 5 |
| 3,645,398 | 2/1972 | Fiocco | 210/DIG. 5 |
| 3,647,606 | 3/1972 | Notaro | 156/93 |
| 4,059,468 | 11/1977 | Bouillon | 156/93 |
| 4,213,863 | 7/1980 | Anderson | 210/DIG. 5 |

FOREIGN PATENT DOCUMENTS 53-89260  8/1978  Japan .................................. 210/799

Primary Examiner—Ernest G. Therkorn
Attorney, Agent, or Firm—Christensen, O'Connor, Johnson & Kindness

[57] ABSTRACT

A repeatedly regeneratable flow-through filter device using a body of reticulated hydrophobic oleophilic synthetic foam for separating oil from water and capable of withstanding high flow pressures without precompression, while being readily compressed mechanically numerous times to the high degree necessary to express oil accumulating on the strands and nodes of the foam material. Support is provided against collapse or precompression under the forces of flow acting on the compressible filter body provided across its flow cross-sectional area and at all desired levels of depth inwardly from the upstream face by inserting lengths of flexible cord of synthetic material at a plurality of distributed locations with the cord precoated with liquid adhesive so as to form bonds at the numerous contact points thereof with the strands and nodes of the foam matrix and so as to transmit the load forces from such bonding points through the cords to an upstream face support screen or grid.

5 Claims, 5 Drawing Figures

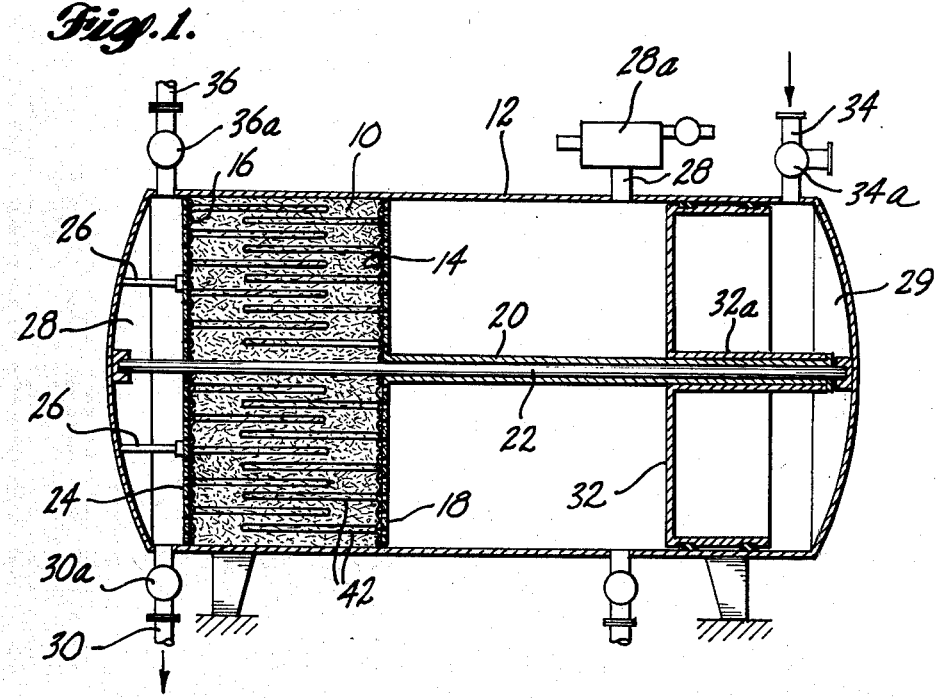
Fig. 1.
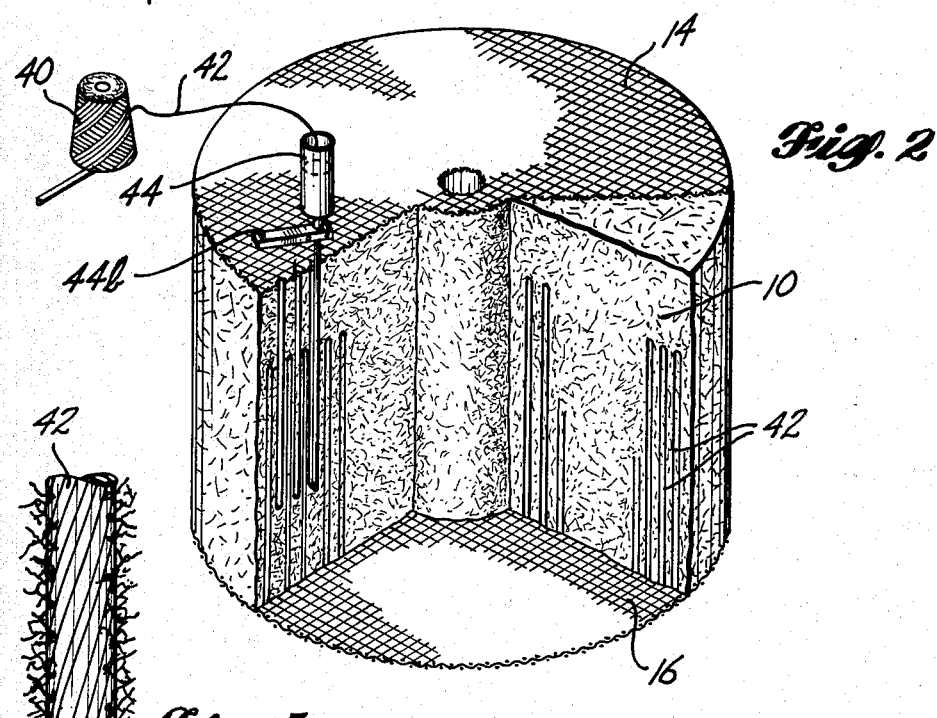
Fig. 2.
Fig. 5.

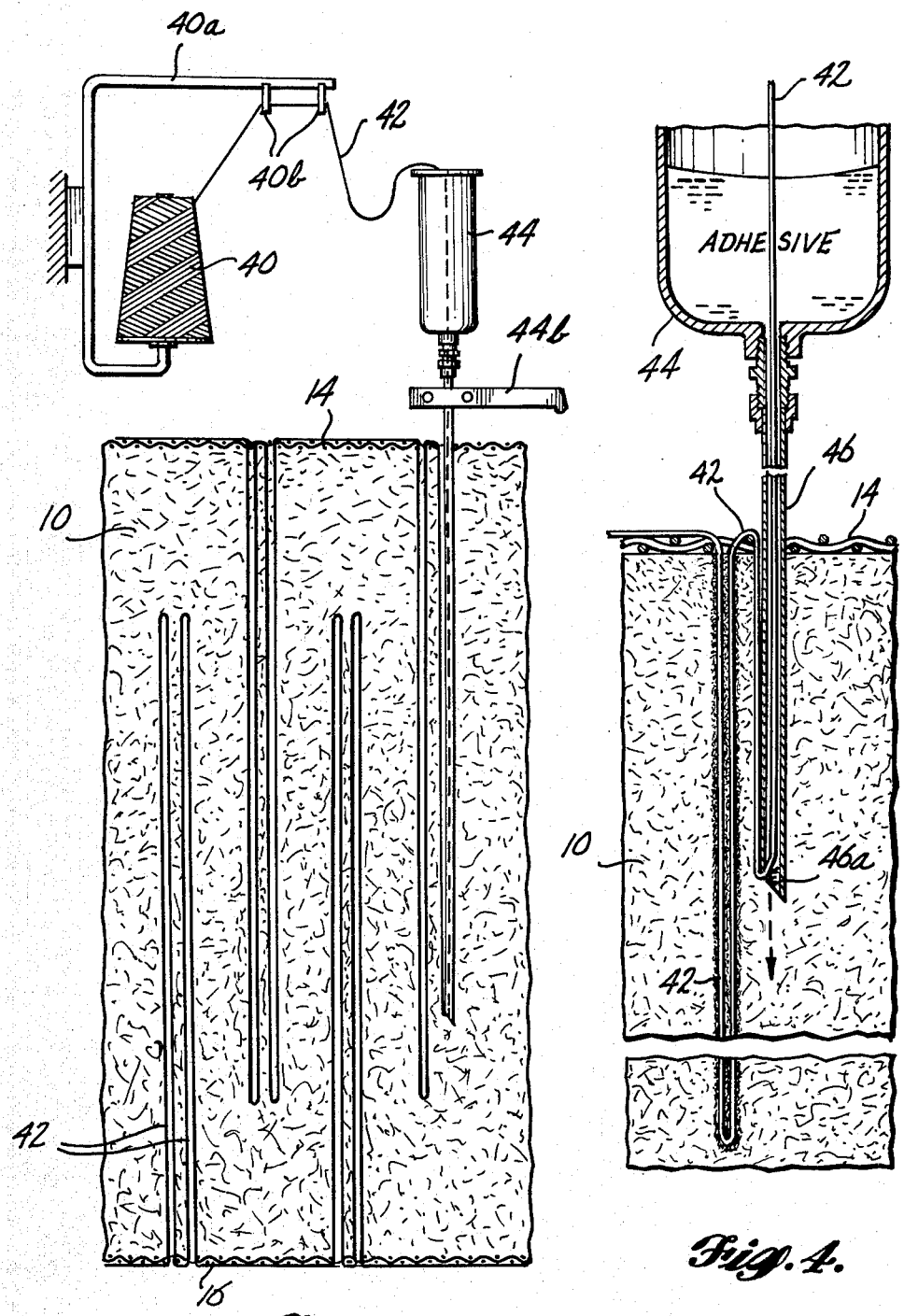

FLOW-THROUGH OIL/WATER SEPARATION FILTER

BACKGROUND OF THE INVENTION

This invention relates to improvements in flow-through oil/water separation filters; more particularly, in those employing filter bodies of reticulated synthetic foam material such as polyurethane foam that can be periodically compressed to discharge the accumulated oil from the strands and nodes of the filter body. The invention also concerns a method and means to produce such separation filters and is herein illustratively described by reference to the presently preferred embodiment thereof as shown in the accompanying drawings; however, it will be recognized that certain modifications and changes therein with respect to details may be made without departing from the essential features involved.

It has been known for years that oil will accumulate on the strands and nodes of a compressible filter body of hydrophobic oleophilic reticulated foam material. However, attempts to use this principle under high rates of flow as required in many industrial applications have met with difficulty due partly to the tendency of the forces of flow acting against the foam body to precompress it against its downstream support, thereby objectionably increasing its resistance to flow. Such precompression also reduced its initial volumetric oil accumulation capacity making it necessary to more frequently interrupt operations in order to squeeze out the accumulated oil.

Recognizing these shortcomings, prior art attempts were made to adhesively bond the foam body by its upstream face to a fixed support grid or openwork disposed transverse to the flow. It was found, however, using available adhesives that the bond soon failed, either by failure of the adhesive itself or by fracturing of the surface strands bonded thereby to the grid when subjected to the heavy forces of flow normally encountered in many industrial applications.

Other prior art methods were also attempted in addressing the problem of foam precompression or distortion under flow-through conditions. One such method included forming the filter body of a series of thin disks of foam material with stiff metal screens interposed between the disks and with a plurality of cords passed through the series and secured to each of the successive screens, as well as to an upstream support. Loaded in tension, the cords effectively held the assembly against the forces of flow passing through it while limiting the amount of precompression of the foam disks because of their limited thickness between screens in the direction of flow. Another method consisted of slicing a unitary foam body in a series of parallel planes oriented in the direction of flow and bonding the slices adhesively together into a structural composite through interposed panels of reinforcing fabric. Secured at their upstream edges to a grid or other suitable support, the fabric interlayers prevented precompression of the longitudinally extending strips by the forces of flow.

While such prior art devices were moderately successful in functional terms; that is, they provided a repeatedly compressible oil/water separator with useful life expectancy, and while they did largely resist the precompression forces of flow during high flow rates, they were costly to manufacture gauged by objectives of industry.

A main object of the present invention is to provide a practicable and relatively low-cost oil/water separation device capable of withstanding high flow-through rates and adapted to undergo numerous repeated compression cycles without damage over a long operating life.

A further object hereof is to provide a relatively inexpensive and effective means for securely connecting a compressible foam body at its upstream face to a superimposed or adjacent grid in such manner as to distribute loading forces over a sufficiently large number of strands and nodes in the foam body as to avoid excessive loading stresses at any location and thereby to adapt the composite to withstand heavy forces of flow without precompression or failure.

A related object hereof is to provide such a supporting and connecting means which does not unduly obstruct flow-through openness of the body nor its capacity to undergo a high degree of compaction so as to express most of the accumulated oil at intervals during flow-through operation of the system in which incorporated.

Further objects are related to the novel method and means for producing such separation filters on a production basis and at low cost.

SUMMARY OF THE INVENTION

As herein disclosed, the invention utilizes flexible cordage material advancing from a source, such as a bobbin, passed through a reservoir of adhesive substance and from the reservoir out through a hollow needle or tubular guide. The tip of the tubular needle is pressed into the body of reticulated foam material to the desired depth, with the cord passing out through the end of the needle and back along the length of the needle in a running loop. During insertion of the needle, cord is drawn from the bobbin through the reservoir of liquid polymer. As the needle is withdrawn from the body, a loop of cord with sides closely adjacent and parallel to the direction of intended flow of liquid is left in the filter body. In this manner, repeating the needle insertion process at a number of locations suitably distributed over the area of the upstream face of the foam body, the body in effect is sewn by the cord to an upstream support screen or grid placed adjacent the upstream face of the body. The cord insertions need not and typically do not pass all the way through the body but merely penetrate to the desired depth. The depth needed with the adhesive forming a plurality of contact point bonds between the cord and the strands and nodes contacted by the cord, is that which, in the aggregate of the individual load-bearing capabilities of the individual contact point bonds, will withstand the flow load forces acting on the body and which must be transferred to the upstream openwork or screen. The screen itself may be secured to a suitable structure to hold it rigid in position in the flow passage, such as in a filter chamber. Contacted also at its downstream face by a supporting screen or grid, and also preferably secured in similar manner to that screen or grid, the filter body can be periodically compressed as necessary to express any accumulations of oil therein during the continuation of the flow-through filtration process.

By employing a filter body of reticulated oleophilic hydrophobic material, oil may be separated from oily water in this manner and the filter body periodically purged of its accumulations of oil, while the water flows through and is substantially freed of oil in suspension therein. Using a suitable flexible fabric cord, such as one knitted or twisted from polymer threads, and a suitably chosen polymeric adhesive material that is flexibly pliant when set, the polymeric reticulated foam body may be compressed repeatedly to express accumulated oil without undue stress being placed on the bonded joints between the cord surface strands and the foam matrix strands and nodes. Moreover, with the preferred reticulated foam material typically used, such as polyurethane, a material quite strong in tension, the cord insertion locations need not be so numerous nor positioned so closely together that they unduly restrict the open regions between them to permit free flow-through action of the liquid to be filtered. In effect, the inserted cord lengths act as tension members that support the lattice of strands and nodes of the filter body extending or bridging between cords at all levels of depth of penetration of the cord in the filter body where bonding occurs. Thus, there is very little sagging of the filter body strands between cords under flow forces either at the upstream face or at any level of depth in the filter body.

These and other features and aspects of the invention will become more fully evident from the detailed description that follows.

BRIEF DESCRIPTION OF THE DRAWINGS

FIG. 1 is a sectional side elevation view of a portion of stationary oil/water separator apparatus illustrating the invention in its preferred embodiment and setting;

FIG. 2 is a perspective view with parts broken away illustrating the novel filter device used in the separator of FIG. 1; and FIG. 3 is an enlarged sectional detail of the filter device in process of manufacture;

FIG. 4 is a still further enlarged fragmentary sectional side view depicting in greater detail the novel tooling means and method for producing the improved filter device in its preferred form; and FIG. 5 is a greatly enlarged sectional detail showing a fragment of filter body and short length of supporting cord depicting to an approximation the bonding of cord strands to the nodes and strands of the reticulated foam of the filter body.

DETAILED DESCRIPTION REFERENCED TO THE DRAWINGS

As illustrated, the filter apparatus comprises an elongated circular cylindrical body 10 of reticulated oleophilic hydrophobic foam material such as polyurethane foam. The pore size may vary, but in most applications will be selected in the range of from one-twentieth to one-tenth inch in average diameter or transverse dimension between opposing nodes and opposing strands. The filter material may also vary. In general, the filter body may be cut or molded in a single block of foam material, although in some instances, it may be desirable to form it from a composite assembly of disks or slabs. These and similar specifics will be seen in most applications to be largely matters of design preference or situational requirements.

In FIG. 1, the filter body 10 is accommodated as a tightly fitting plug slidably accommodated in the cylindrical flow chamber 12. The filter body is secured at its opposite end faces in a special manner to be described to an openwork or flow-through screen or grid such as circular metal screens 14 and 16. Screen 14, secured to the upstream face of the filter body, is lashed, wired, bolted, welded, or otherwise fastened to a multiply apertured flow-through plate 18 mounted on one end of a support tube 20. The screens and plate 18 are also circular and slightly smaller than the interior wall diameter of cylindrical chamber 12. The plate's support tube 20 is slidably retained on a stationary central axial guide rod 22 extending between end walls of the chamber.

Downstream filter body support screen 16, if one is used, abuts a stationary multiply apertured circular flow-through plate 24 supported by props 26 in fixed transverse position across the interior of the chamber 12.

Normal flow of an oil/water mixture to be separated by the filter device through chamber 12 enters under pressure of an external source (not shown) such as a pump or storage tank by way of inlet pipe 28 with valve 28a therein open. It passes in chamber 12 first through apertured plate 18, then through screen 14, filter body 10, screen 16 and finally plate 24. Water emerging from filter body 10, largely purged of oil, enters collecting chamber 28 and discharges through outlet pipe 30.

After a period of filtration flow through the chamber 12 and the filter body 10, valve 28a is closed and a cup-shaped piston 32, slidably fitted in chamber 12, is advanced by water under pressure injected into the opposite end of the chamber 12 behind the piston. The piston 32 is mounted on support tube 32 which, in turn, is slidably retained on tube 20 which it encircles. Such pressurized water enters through pipe 34 with valve 34a set to permit it. It advances the piston against plate 18, and thereafter advances it as far as it will go under the applied pressure, progressively compressing the polymeric filter body 10 against its stationary backing plate 24. This action of compressing the filter body to a minor fraction of its normal extended length squeezes out the oil accumulated on the strands and nodes of the filter body and forces it into end chamber 28. The piston 32 itself, being solid or nonpermeable to oil, functions during the compression stroke as a barrier against backflow of discharging oil in the upstream direction.

After the oil thus collected in end chamber 28 is drained through outlet pipe 30, valve 36a in pipe 36 is opened and water is injected under pressure from pipe 36 into the end chamber 28 with valve 30a in pipe 30 now closed. At the same time, three-way valve 34a is positioned in an alternate setting. In this setting, it permits discharge of water trapped behind piston 32 in end chamber 39, enabling piston 32 to be forced back to its initial retracted position (FIG. 1) by water pressure from inlet pipe 36. In being forced by water pressure into retracted position, piston 32 carries with it guide tube 20 by reason of the distal end of its support tube 32a bearing against a flange on the end of tube 20.

Thus, the return stroke of piston 32 also serves to positively reexpand or stretch out the previously compressed filter body 10, returning it to its original length and reopening its pore spaces to restore its initial low resistance to flow-through action and its volumetric oil accumulation capacity to the original level. At that juncture, valve 28a is reopened so as to restore flow of oily water into and through the system while valve 36a in pressure pipe 36 is closed and valve 30a in discharge pipe 30 is reopened. Oil again starts accumulating in the filter body while water, largely purged of oil, discharges through outlet pipe 30.

This apparatus, as thus far described, is not part of the present invention but is generally as disclosed in U.S. Pat. No. 4,213,863 issued July 22, 1980.

Turning now to the improvements provided by the present invention for use in the above-described apparatus setting, polymeric (preferably polyurethane) reticulated foam filter body 10 is secured to upstream screen 14 and it may also be secured to screen 16 in novel manner and for the abovedescribed purposes. A source roll or spool 40 of multistrand pliant cord 42, preferably of a compatible material such as a polyester, like Dacron, is arranged to permit feeding or drawing the cord from the source roll through a reservoir 44 of liquid adhesive binder. The cord, of the order of $\frac{1}{8}$" to 3/32" in diameter in a typical application may comprise a weave, braid or twist of threads which will bond to the foam strands and nodes through a properly selected adhesive. The adhesive which may, for instance, comprise liquid polyurethane, should also be selected to wet both the cord and the foam matrix and to exhibit flexibility when set as to minimize undue stress concentrations in the bonds and in the strands and nodes bonded to the cord when the filter body is being compressed and stretched (FIG. 5).

Passage of the cord through a reservoir of adhesive is the preferred way to coat the cord with liquid adhesive before it is forced into and through the filter body material. Reservoir 44 in this instance is in the form of an elongated container cup or tube mounting a hollow pointed discharge "needle" 46 at its lower end in registry with a bottom outlet, much like a syringe. The needle bore 46a is slightly larger in diameter than the cord so as to pass the cord slidably through the needle after descending through the liquid adhesive in the cup. This coats the cord's surface fibers and/or saturates interstices thereof with the liquid adhesive and it also serves as a lubricant permitting the cord to slide very freely through the needle bore and through the filter body matrix.

The needle, with the cup 44 held upright and with a length of cord projecting beyond the tip of the needle, is advanced through a selected mesh opening in the screen 14 and into the filter body 10 parallel to its longitudinal axis, i.e., in the direction of intended liquid flow. Its leading extremity doubled back over the tip of the needle is driven into the filter body to whatever depth is determined necessary for bonding purposes. Considering the load forces of pressurized flow acting on the upstream face and on the interior strands and nodes of the filter body at all depths in the filter body, the cord penetration depth needed is that which enables the doubled cord to contact and become bonded at a sufficient number of contact points with strands and nodes of the filter matrix to bear the load forces of flow (and stretching action) at all depths therein. A handle 44b on the reservoir/needle unit may be provided to help hold and manipulate the reservoir and needle in the process of inserting and retracting the needle. In FIG. 3, the spool of cord is shown mounted on a spiral support 40a provided with cord guides 40b.

As the needle is withdrawn after each cord loop insertion, the resilient grip on the cord by the surrounding filter body strands hold the looped length of cord in its inserted position to be permanently bonded in that position when the adhesive sets. The needle is moved laterally into a view location and reinserted through the screen and into the filter body (FIG. 4) with the cord itself stretched over the intervening screen mesh so as to lash it to the face of the filter body. The insertion is repeated at a number of locations suitably distributed over the screen and thereby over the flow cross-sectional area of the filter body. The spacings between inserted lengths of cord are not so close as to materially reduce the flow-through open cross section of the filter body, but close enough to permit the bridging spans of matrix material between cords to bear the flow loads without undue sag, as previously stated.

Thus, the myriad of bonds between each inserted cord length and the filter body strand/node elements enable the filter body to withstand high flow velocity pressures without collapse or precompression while permitting numerous purgings of oil by compression of the filter body followed by stretching the same back to its original length and open-pore condition.

These and other aspects of the invention will be evident to those skilled in the related art based on an understanding of the essential concept and advantages of the invention as disclosed herein in its preferred form.

The embodiments of the invention in which an exclusive property or privilege is claimed are defined as follows:

1. Repeatedly compressible and reexpandable flow-through filter means comprising a filter body of transversely monolithic reticulated synthetic foam material subject to compressive deformation under the forces of liquid flow, and holder means for positioning said filter body in a liquid flow path and for reinforcing said filter body against such compressive deformation, said holder means including flow-traversable, fixed upstream support means and fixed downstream support means respectively overlying and adjacent to the upstream and downstream faces of said body, a plurality of individual separate lengths of flexible cords fastened to said upstream support means at respective locations distributed in spaced relationship across said path and penetrating said filter body to a depth at least partly through the body substantially in the direction of liquid flow through said body, each of said elongated cord lengths being adhesively bonded to strands and nodes of said body contacted thereby substantially along the full length depth of penetration of said cord lengths in said body, thereby to reinforce said body against compressive deformation against said downstream support means under the forces of liquid flow acting on said body.

2. The filter means defined in claim 1 wherein the filter body comprises hydrophobic oleophilic reticulated foam material adapted to pass oily water through the same and to accumulate oil on the strands and nodes thereof during such flow, and wherein the cord comprises flexible multistrand organic material bonded adhesively to the strands and nodes by having been precoated with unset adhesive bonding material at the time of insertion through said body.

3. The means defined in claim 2 wherein the cord lengths are doubled back upon themselves at their inserted ends and wherein the upstream support means comprises a grid-like structure with elements over which the cords are looped for securement thereto between the lengths thereof extending into the body filter.

4. The means defined in claim 3 wherein the filter body comprises reticulated polyurethane foam material.

5. The combination defined in any of claims 1-4, inclusive, further comprising an elongated cylindrical flow-confining enclosure in which said reticulated filter body is slidably fitted, and means operable at intervals to effect relative movement between said upstream and downstream support means toward and from each other so as to compress and permit reexpansion of said body, in situ, thereby alternately to expel into the enclosure by such compression material accumulating in said body and to restore flow-through openness of the body by such reexpansion.

* * * * *